(12) United States Patent
Harris

(10) Patent No.: US 6,932,288 B1
(45) Date of Patent: Aug. 23, 2005

(54) APPARATUS FOR REMOVING FRANGIBLE OBJECTS FROM A CONTAINER

(76) Inventor: Jack Harris, 6638 Peoue La., Baton Rouge, LA (US) 70817

( * ) Notice: Subject to any disclaimer, the term of this patent is extended or adjusted under 35 U.S.C. 154(b) by 0 days.

(21) Appl. No.: 10/663,337

(22) Filed: Sep. 16, 2003

Related U.S. Application Data

(63) Continuation of application No. 10/152,764, filed on May 21, 2002, now Pat. No. 6,722,592.

(51) Int. Cl.[7] ............................................. B02C 19/12
(52) U.S. Cl. ................................ 241/186.2; 241/189.1
(58) Field of Search .......................... 241/186.2, 189.1, 241/46.08, 46.02, 46.01

(56) References Cited

U.S. PATENT DOCUMENTS

| | | |
|---|---|---|
| 3,856,218 A | 12/1974 | Harmon et al. |
| 4,568,029 A | 2/1986 | Newton et al. |
| 5,388,773 A | 2/1995 | Perry |

FOREIGN PATENT DOCUMENTS

| | | |
|---|---|---|
| DE | 19650188 | 10/1998 |
| JP | 62014938 | 1/1987 |
| JP | 62023433 | 1/1987 |
| JP | 04045840 | 2/1992 |

*Primary Examiner*—Mark Rosenbaum
(74) *Attorney, Agent, or Firm*—Keaty Professional Law Corporation

(57) ABSTRACT

Frangible objects that become packed in large containers are removed by crushing the objects while they are still in the containers. A motor-driven crushing assembly is lowered into the container, where rotating strikers come into contact with the frangible objects and break the objects into smaller fragments. The broken fragments are guided into a guiding chute, from which they may be removed by conventional industrial vacuum equipment. The invention may be used for unloading ceramic packing from acid towers.

15 Claims, 1 Drawing Sheet

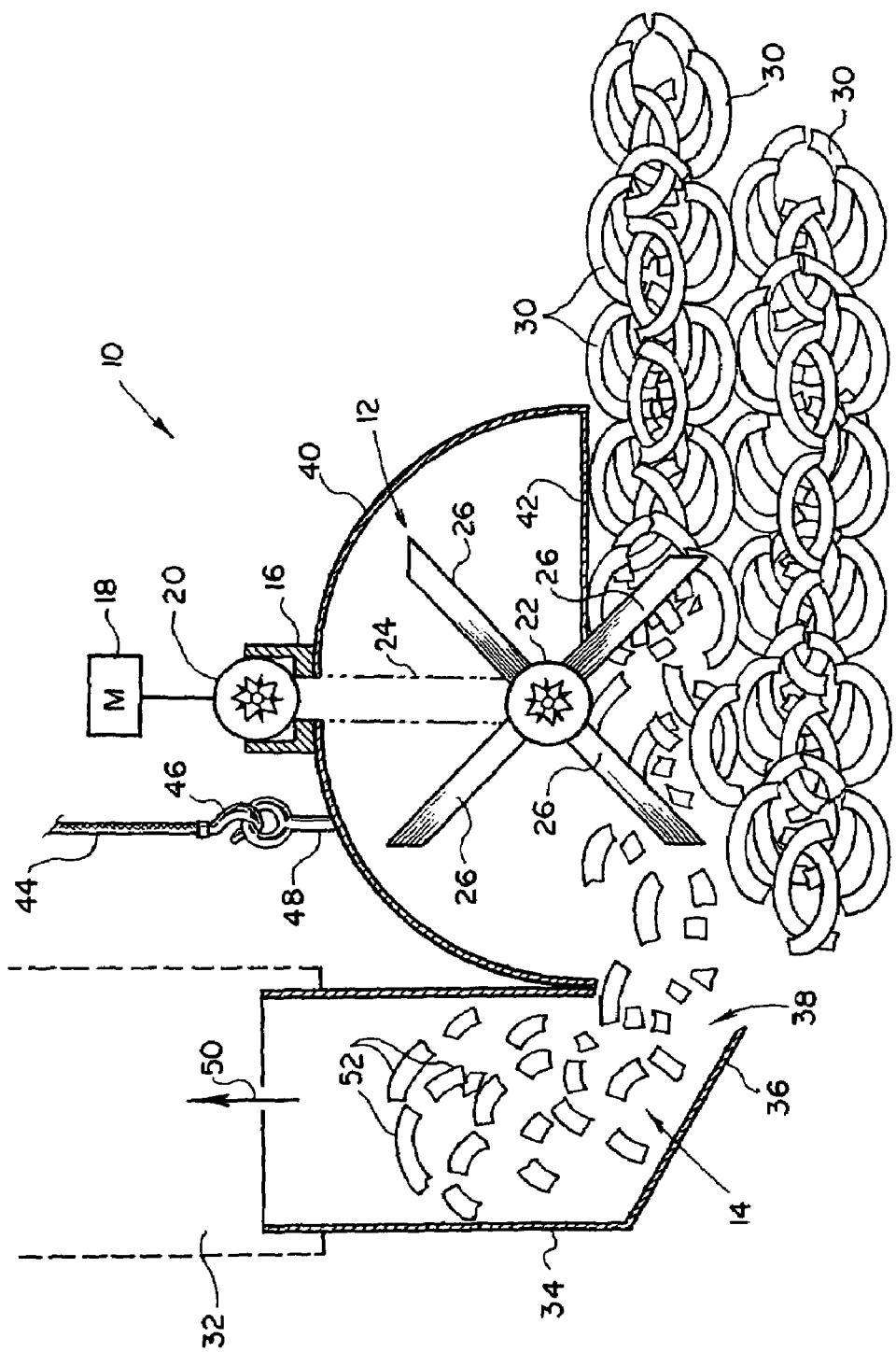
F I G. 1

APPARATUS FOR REMOVING FRANGIBLE OBJECTS FROM A CONTAINER

CROSS-REFERENCE TO RELATED APPLICATIONS

This application is continuation of my application Ser. No. 10/152,764, filed on May 21, 2002 entitled "Apparatus for Removing Frangible Objects from a Container," now U.S. Pat. No. 6,722,592, the full disclosure of which is incorporated by reference herein.

BACKGROUND OF THE INVENTION

This invention relates to an apparatus for removing frangible objects from a container, and more particularly, to an apparatus for unloading ceramic packing from an acid tower or similar container.

During production of acids, various solid packing materials are used in the acid tower. The processing vessel, or the acid tower, needs to be emptied and cleaned from time to time. At that time the packing material, which is conventionally called "ceramic packing" needs to be removed from the vessel. Conventional ceramic packing is made of frangible ceramic material; they are formed in various shapes and sizes.

Conventionally, the ceramic packing is removed from the acid towers by mining or vacuum. The vacuum tubes or hoses used are typically 6 inches in diameter. Due to the size and shape ceramic packing becomes locked together and removal of the ceramic packing presents a substantial difficulty. A typical acid-processing tank is about 60 feet high and 9–25 feet in diameter. The packing may be deposited on a support grid of the tank and occupy up to 15 feet of the height of the tank. In effect, the interlocking saddles form a packing column in the processing tank.

With conventional equipment, even if two vacuum machines are used in tandem, the cleanup and removal operation is extremely slow, allowing to move about 200–300 cubic feet an hour. When the typical area to be cleaned is about 7000 cubic feet, one can expect to spend about 30 hours cleaning up the acid tower and unloading the ceramic packing. During vacuuming, the ceramic pieces, being frangible, often break. However, the breakage is of no concern since the packing is disposed of after it has been removed from the acid-processing vessel, or tank.

The present invention contemplates elimination of drawbacks associated with the prior art and provision of an apparatus for unloading the ceramic packing or similar frangible objects from a container.

SUMMARY OF THE INVENTION

It is, therefore, an object of the present invention to provide an apparatus for removing frangible objects from a container with the objects being designated for disposal.

It is another object of the present invention to provide an apparatus for unloading ceramic packing from an acid-processing tank.

It is a further object of the present invention to provide an apparatus for unloading ceramic packing that is easy to operate and inexpensive to manufacture and that can be used in cooperation with conventional vacuuming equipment.

It is still a further object of the present invention to provide a method of unloading frangible objects from a container.

These and other objects of the present invention are achieved through a provision of an apparatus for unloading frangible members from a container, such as for instance a processing tank of an acid tower. The unloading apparatus comprises a crushing assembly provided with a plurality of rotatable strikers that come into contact with the frangible members and break the frangible members into smaller fragments. The unloading assembly is driven by a motor, for instance a hydraulic motor, which imparts the torque to the crushing strikers. The motor-driven drive unit of the crushing assembly has sufficient power to cause fracture of the frangible members.

The crushing assembly is provided with a guiding chute secured adjacent to the crushing stikers. An opening formed in the lower portion of the guiding chute receives the broken fragments, which are pushed by the crushing strikers toward the guiding opening. The upper portion of the guiding chute is configured to be connected to a vacuum source, such as a hose of a vacuum apparatus. The crushed fragments are sucked from the guiding chute and delivered outside of the container, or tank by the vacuum apparatus.

BRIEF DESCRIPTION OF THE DRAWINGS

Reference will now be made to the drawings, wherein like parts are designated by like numerals, and wherein FIG. 1 is a schematic view of the unloading apparatus in accordance with the present invention.

DETAILED DESCRIPTION OF THE PREFERRED EMBODIMENT

Turning now to the drawing in more detail, the apparatus of the present invention for unloading frangible objects is designated by numeral 10. The apparatus 10 comprises a crush assembly 12 and a guide chute 14. The crush assembly 12 comprises a drive unit 16 operationally connected to an external power source, for instance a hydraulic motor 18.

The drive unit 16 drives a pair of gear wheels 20, 22 connected with a chain 24. Which transmits a rotating force from the unit 16 to the gear wheels 20 and then to the gear wheel 22. A plurality of crushing strikers 26 are operationally connected to the driven gear wheel 22. The strikers 26 rotate when the drive unit is in operation. The strikers 26 come into contact with the frangible objects inside the container and crush or break the frangible objects.

In FIG. 1, the frangible objects are schematically illustrated as interlocking saddles 30, which form a packing column. The ceramic packing members, or interlocking 30 become crushed into smaller pieces, with any ceramic packing members being reduced to fragments of 3 to 4 inches in size. As the strikers 26 rotate, they tend to also move the broken fragments in the direction of the guiding chute 14.

The guiding chute 14 is connected to a conventional vacuum hose 32, which, in turn, is connected to a vacuum equipment (not shown) outside of the processing tank. The guiding chute 14 has a vertical wall 34 that is configured for engagement with a vacuum hose 32 and an inclined bottom wall 36. The inclined wall 36 narrows the input opening 38 of the guiding chute 14, so as to facilitate concentration of the broken fragments into a predetermined flow suitable for moving by the vacuum force of a conventional equipment designed for such purposes.

To prevent the fragments from escaping upwardly and causing injury to the operating personnel or damaging the drive unit 16, the apparatus of the present invention provides for the use of a housing 40. As can be seen in FIG. 1, the drive unit 16 is secured outside of the crushing assembly housing 40.

The first gear wheel 20 is mounted outside of the housing 40, where the unit 16 is connected to the power source 18. The second gear wheel 22 is mounted inside the housing 40 adjacent to a bottom support plate 42. The support plate 42 extends inwardly in relation to the arcuate housing, 40 so as to support the gear wheel 22, while allowing the strikers 26 to extend outside of the housing 40 when crushing the frangible members 30 below the crushing assembly 12.

In operation, the crushing assembly 12 is lowered into the processing tank by a chain 44 which carries a hook-like member 46 on the lower end thereof. The hook 46 engages a suspension member 4S attached to the crushing assembly 12. The crushing assembly 12 is fixedly attached to the guiding chute 14. As a result, when the crushing assembly 12 is lowered into the processing tank, above the packing column, the unloading apparatus is oriented in contact with the frangible members 30.

The packing members, such as the interlocking saddles 30 are gradually crushed with the strikers 26, as the apparatus 10 is moved inside the processing tank. If desired, the chain 44 may be substituted by a handle allowing to more easily maneuver the unloading apparatus 10 inside the processing tank or a wheel driven robot. The drive unit 16 can operate a conventional gear drive to impart torque to the strikers 26 and cause them to move inside the packing column while breaking the frangible members. As the fragments are guided into the opening 38 and into the chute 14, they are pulled in the direction of arrow 50 upwardly into the vacuum hose 32, from where the broken fragments 52 are collected and disposed of in the usual manner.

The power source 18 can be any available power source, be it a hydraulic motor, an electrical motor, or other similar means for imparting rotation to the strikers 26. It is envisioned that the unloading apparatus of the present invention can be used for removing other frangible objects from large containers, where the frangible objects become packed, interlocked, or otherwise difficult to remove. By crushing the solid objects inside the container, before the objects are vacuumed, the operator can substantially increase the speed of unloading or cleaning operation and eliminate the need for manual destruction of the packed material.

Many changes and modifications can be made in the design of the present invention without departing from the spirit thereof. I therefore pray that my rights to the present invention be limited only by the scope of the appended claims.

What is claimed is:

1. An apparatus for removing frangible members from an acid processing tank, comprising:
 a crushing assembly adapted for positioning inside the tank, said crushing assembly comprising a means for breaking the frangible members into fragments; and
 a guiding chute mounted in secure attachment with said crushing assembly for guiding the fragments toward a removal conduit.

2. The apparatus of claim 1, wherein said crushing assembly comprises a drive unit, a gear assembly operationally connected to said drive unit, and a plurality of rotatable crushing strikers operationally connected to said gear assembly for imparting a breaking force on said frangible members.

3. The apparatus of claim 2, wherein said gear assembly comprises a pair of gear wheels connected by a driven chain, and wherein said crushing strikers are connected to one of said gear wheels.

4. The apparatus of claim 2, wherein said drive unit is adapted for connection to a power source.

5. The apparatus of claim 2, further comprising a crushing assembly housing, said housing enclosing at least said crushing strikers.

6. The apparatus of claim 5, wherein said housing is fixedly attached to said guiding chute, and wherein a guiding opening is defined by a lower portion of said guiding chute, said guiding opening being located adjacent to said crushing strikers.

7. The apparatus of claim 6, wherein said crushing strikers are sized to facilitate movement of the fragments into said guiding opening.

8. The apparatus of claim 6, wherein said guiding chute comprises upwardly extending sidewalls and an inclined bottom wall, a lower end of said bottom wall defining a portion of said guiding opening.

9. The apparatus of claim 6, wherein said housing is provided with a means for suspending the crushing assembly inside said tank.

10. The apparatus of claim 1, wherein said guiding chute is sized and shaped for connection to a vacuum source.

11. An apparatus for removing frangible ceramic packing members from an acid processing tank, comprising:
 a crushing assembly adapted for positioning inside the tank, said crushing assembly comprising a means for breaking the packing members into fragments; and
 a guiding chute mounted in secure attachment with said crushing assembly for guiding the fragments toward a removal conduit.

12. The apparatus of claim 11, wherein said crushing assembly comprises a plurality of motor-driven rotatable crushing strikers contacting the packing members for imparting a breaking force on said packing members.

13. The apparatus of claim 11, further comprising a means for suspending said crushing assembly inside said tank upon demand.

14. The apparatus of claim 11, wherein said guiding chute is provided with in intake opening and wherein said strikers are sized to guide broken fragments of the packing members into the intake opening of the guiding chute.

15. The apparatus of claim 11, wherein said guiding chute comprises an outlet opening adapted for connection to a vacuum source.

* * * * *